(12) United States Patent
Wang et al.

(10) Patent No.: US 12,382,545 B2
(45) Date of Patent: Aug. 5, 2025

(54) RELIABLE MULTICAST TRANSMISSION WITH COMPACT PROTOCOL STACK

(71) Applicant: MediaTek Singapore Pte. Ltd., Singapore (SG)

(72) Inventors: Xuelong Wang, Beijing (CN); Yuanyuan Zhang, Beijing (CN); Per Johan Mikael Johansson, Singapore (SG); Pradeep Jose, Cambourne (GB); Ming-Yuan Cheng, Tsinchu (TW); Chia-Chun Hsu, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 297 days.

(21) Appl. No.: 18/064,237

(22) Filed: Dec. 9, 2022

(65) Prior Publication Data

US 2023/0116092 A1    Apr. 13, 2023

Related U.S. Application Data

(63) Continuation of application No. PCT/CN2021/103210, filed on Jun. 29, 2021, which
(Continued)

(51) Int. Cl.
*H04W 76/40* (2018.01)
*H04L 1/1607* (2023.01)

(52) U.S. Cl.
CPC .......... *H04W 76/40* (2018.02); *H04L 1/1685* (2013.01)

(58) Field of Classification Search
CPC ..... H04W 76/40; H04W 76/27; H04W 76/11; H04W 76/15; H04W 76/16; H04W 4/06;
(Continued)

(56) References Cited

U.S. PATENT DOCUMENTS

2004/0085926 A1* 5/2004 Hwang .................. H04W 4/06
370/328

FOREIGN PATENT DOCUMENTS

CN       1852607 A  * 10/2006
CN     106302245 A    6/2015
(Continued)

OTHER PUBLICATIONS

International Search Report and Written Opinion of International Search Authority for PCT/CN2021/103210 dated Sep. 28, 2021 (9 pages).
(Continued)

*Primary Examiner* — Peter Chen
(74) *Attorney, Agent, or Firm* — Helen Mao; Imperium Patent Works

(57) ABSTRACT

Apparatus and methods are provided for reliable multicast transmission with compact protocol stack. In one novel aspect, compact protocol stacks are configured for the UE and the base station handling both the PTM RB and the PTP RB. The compact protocol stack is either configured a compact RLC entity or a compact PDCP entity. The UE monitors a PTM LCH and a PTP LCH and sends feedback to the network with the PTP RB. The base station transmits MBS data packets in the PTM mode to the one or more subscriber UE, monitors feedback report from each subscriber UEs through corresponding PTP RB, and retransmits MBS data packets to one or more UEs through corresponding PTP RBs based on corresponding feedback reports. PTM-to-PTP and PTP-to-PTM mode switches are performed when triggering events are detected. The mode switch notification is sent to UEs via MAC CE or RLC control PDU.

20 Claims, 10 Drawing Sheets

Related U.S. Application Data is a continuation of application No. PCT/CN2020/099209, filed on Jun. 30, 2020.

(58) Field of Classification Search
CPC .............. H04W 72/30; H04W 36/0007; H04L 1/1685; H04L 12/189; H04L 2001/0093
See application file for complete search history.

(56) References Cited

FOREIGN PATENT DOCUMENTS

| | | | | | |
|---|---|---|---|---|---|
| CN | 104813690 A | * | 4/2019 | ........... | H04L 12/185 |
| CN | 112351403 A | * | 2/2021 | ......... | H04L 41/0816 |
| JP | WO2017046977 A1 | | 9/2015 | | |

OTHER PUBLICATIONS

Ericsson et al. SA WG2 Meeting #139E S2-2003682 KI#7 "Always RAN based switching within NR coverage" Jun. 12, 2020 (Section 6.X).

Juniper Networks et al. SA WG2 Meeting #S2-139e S2-2003567r012 5MBS terminologies on delivery methods Jun. 12, 2020. (the whole document).

* cited by examiner

RELIABLE MULTICAST TRANSMISSION WITH COMPACT PROTOCOL STACK

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2021/103210, titled "Methods and apparatus of Methods and apparatus of Reliable Multicast Transmission with Compact Protocol Stack," filed on Jun. 29, 2021. International Application PCT/CN2021/103210, in turn, claims priority under 35 U.S.C. § 120 and § 365(c) from International Application PCT/CN2020/099209, titled "Methods and apparatus of Methods and apparatus of Reliable Multicast Transmission with Compact Protocol Stack," with an international filing date of Jun. 30, 2020. The disclosure of each of the foregoing documents is incorporated herein by reference.

TECHNICAL FIELD

The disclosed embodiments relate generally to wireless communication, and, more particularly, to reliable multicast transmission with compact protocol stack.

BACKGROUND

With the exponential growth of wireless data services, the content delivery to large mobile user groups has grown rapidly. Initial wireless multicast/broadcast services include streaming services such as mobile TV and IPTV. With the growing demand for large group content delivery, recent application development for mobile multicast services requires highly robust and critical communication services such as group communication in disaster situations and the necessity of public safety network-related multicast services. The early 3GPP in the LTE standard defines enhanced multimedia broadcast multicast services eMBMS. The single-cell point to multipoint (SC-PTM) services and multicast-broadcast single-frequency network (MBSFN) is defined. The fifth generation (5G) multicast and broadcast services (MBS) are defined based on the unicast 5G core (5GC) architecture. A variety of applications may rely on communication over multicast transmission, such as live stream, video distribution, vehicle-to-everything (V2X) communication, public safety (PS) communication, file download, and so on. In some cases, there may be a need for the cellular system to enable reliable multicast transmission to ensure the reception quality at the UE side. Reliable transmission for some multicast services in the NR system requires feedback on the reception of the multicast transmission, which helps the network to perform necessary retransmission of the content to the UE.

Improvements and enhancements are required to support reliable multicast transmission and reception to enable UE uplink feedback and retransmission for MBS data packets.

SUMMARY

Apparatus and methods are provided for reliable multicast transmission with compact protocol stack. In one novel aspect, a compact UE protocol stack for data reception of MBS data packets from both the PTM RB and the PTP RB. The UE monitors a PTM logical channel (LCH) for PTM data packets and a PTP LCH for PTP data packets, wherein the PTM LCH and the PTP LCH are independent, assembles data packets from the PTM LCH and the PTP LCH at one UE protocol entity of the compact UE protocol stack, and provides uplink feedback for MBS data reception status through the PTP RB using a cell radio network temporary identifier (C-RNTI). In one embodiment, the UE compact protocol stack includes a compact RLC entity. The one embodiment, the compact RLC entity at the UE provides RLC status report to the network. In another embodiment, the UE compact protocol stack includes a compact PDCP entity and two RLC entities with one RLC entity for the PTM data and one RLC entity for the PTP data. In one embodiment, the compact PDCP entity at the UE provides the PDCP status report to the network.

In one novel aspect, the base station is configured with a compact protocol stack for data transmission of MBS data packets for both the PTM RB and the one or more PTP RBs, wherein the compact network protocol stack is configured with combination transmission mode for both the PTM and one or more PTP transmissions. The base station transmits MBS data packets in PTM mode to the one or more subscriber UE, monitors feedback report from each subscriber UEs through corresponding PTP RB, and retransmits MBS data packets to one or more UEs through corresponding PTP RBs based on corresponding feedback reports. In one embodiment, the compact network protocol stack includes a compact RLC entity that maintains independent retransmission buffers for each corresponding subscriber UEs. In another embodiment, the compact network protocol stack includes a compact PDCP entity that maintains independent retransmission buffers for each corresponding subscriber UEs. In one embodiment, the base station performs PTM-to-PTP mode switch upon detecting one or more triggering events. The triggering events include a number of subscribers for the MBS is lower than a predefined PTM threshold. In another embodiment, the base station performs PTP-to-PTM mode switch upon detecting one or more triggering events. The triggering events include a number of subscribers for the MBS is higher than a predefined PTP threshold. In one embodiment, the base station indicates a mode switch to the one or more subscriber UEs through a control message selecting from a MAC control element (CE) and a RLC control packet data unit (PDU), and wherein the mode switch comprises a PTM mode to PTP mode switch and a PTP mode to the PTM switch.

This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Aspects of the present disclosure provide methods, apparatus, processing systems, and computer readable mediums for NR (new radio access technology, or 5G technology) or other radio access technology. NR may support various wireless communication services, such as enhanced mobile broadband targeting wide bandwidth, millimeter wave targeting high carrier frequency, massive machine type communications targeting non-backward compatible MTC techniques, and/or mission critical targeting ultra-reliable low-latency communications. These services may include latency and reliability requirements. These services may also have different transmission time intervals (TTI) to meet respective quality of service (QoS) requirements. In addition, these services may co-exist in the same subframe.

Figure 1:
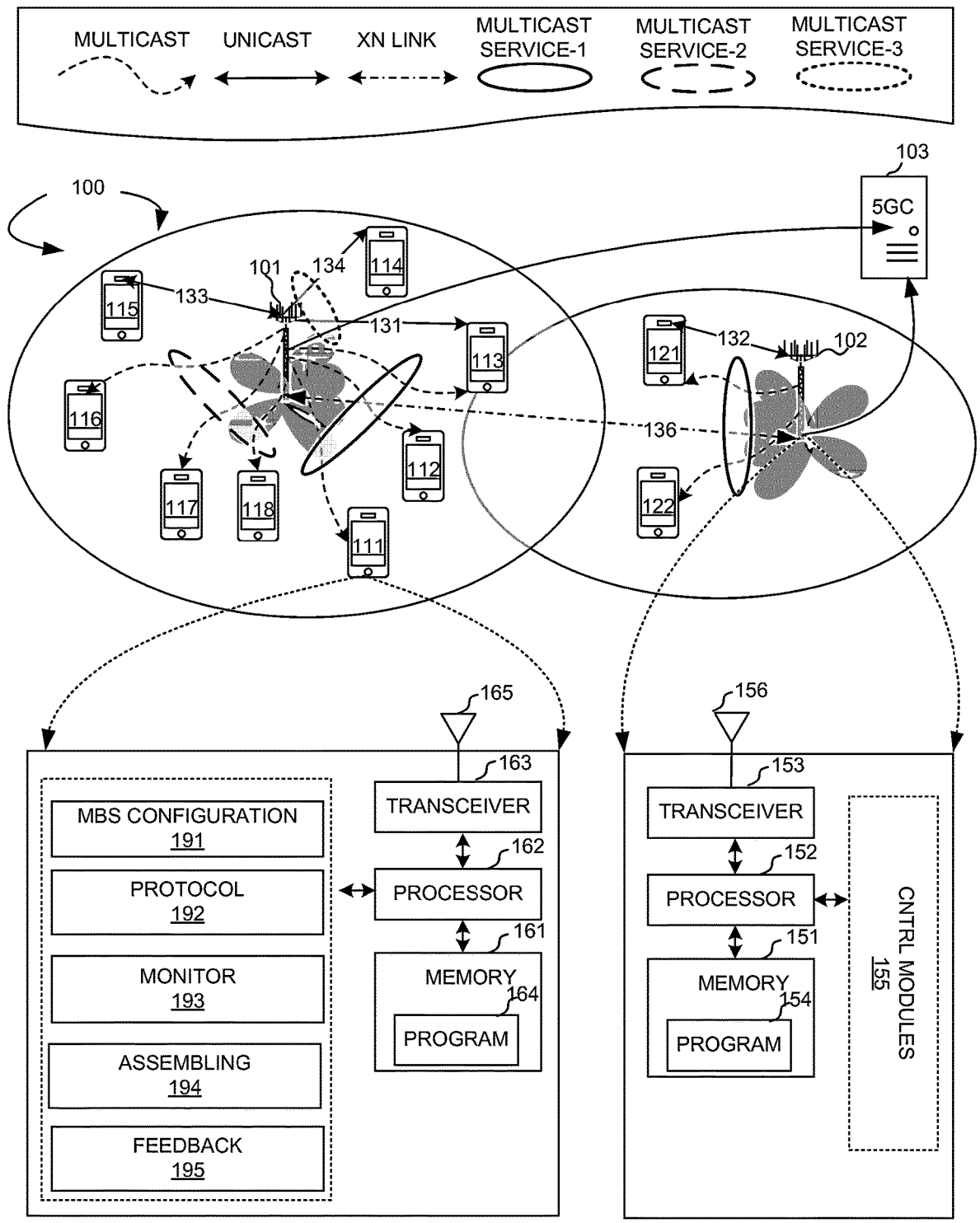
FIG. 1 is a schematic system diagram illustrating an exemplary NR wireless network that supports reliable multicast transmission for multicast services in a NR network with uplink feedback.

FIG. 1 is a schematic system diagram illustrating an exemplary NR wireless network that supports reliable multicast transmission for multicast services in a NR network. NR wireless system 100 includes one or more fixed base infrastructure units forming a network distributed over a geographical region. The base unit may also be referred to as an access point, an access terminal, a base station, a Node-B, an eNode-B (eNB), a gNB, or by other terminology used in the art. The network can be homogeneous network or heterogeneous network, which can be deployed with the same frequency or different frequency. gNB 101 and gNB 102 are base stations in the NR network, the serving area of which may or may not overlap with each other. The backhaul connection such as 136, connects the non-co-located receiving base units, such as gNB 101 and gNB 102. These backhaul connections, such as connection 136, can be either ideal or non-ideal. gNB 101 connects with gNB 102 via Xnr interface. The base stations, such as gNB 101 and gNB 102, connects to the 5G core (5GC) network 103 through network interfaces, such as N2 interface for the control plane and N3 interface for the user plane.

NR wireless network 100 also includes multiple communication devices or mobile stations, such as user equipments (UEs) 111, 112, 113, 114, 116, 117, 118, 121 and 122. The UE may also be referred to as mobile station, a mobile terminal, a mobile phone, smart phone, wearable, an IoT device, a table let, a laptop, or other terminology used in the art. The mobile devices can establish one or more unicast connections with one or more base stations. For example, UE 115 has unicast connection 133 with gNB 101. Similarly, UEs 121 connects with gNB 102 with unicast connection 132.

In one novel aspect, one or more radio bearers are established for one or more multicast sessions/services and the UE provides uplink feedback. A multicast service-1 is provided by gNB 101 and gNB 102. UEs 111, 112 and 113 receive multicast services from gNB 101. UEs 121 and 122 receive multicast services from gNB 102. Multicast service-2 is provided by gNB 101 to the UE group of UEs 116, 117, and 118. Multicast service-1 and multicast service-2 are delivered in multicast mode with a multicast radio bearer (MRB) configured by the NR wireless network. The receiving UEs receives data packets of the multicast service through corresponding MRB configured. UE 111 receives multicast service-1 from gNB 101. gNB 102 provides multicast service-1 as well. In one novel aspect, a unicast RB associated with the multicast RB is configured for reliable MBS. UE 121 is configured with multicast service-1. UE 121 is configured with multicast RB as well as the unicast RB 132. The associated unicast RB 132 receives MBS data packets together with the multicast RB. The associated unicast RB 132 is used to provide reliable MBS for UE 121. Similarly, for UEs 111, 112, and 113, which receive multicast serive-1 through corresponding multicast RB and/or associated unicast RB. Each UE receiving MBS is also configured with at least one corresponding associated unicast RB for reliability. Similarly, for multicast service-2, UEs 116, 117, and 118 receive multicast serive-2 through corresponding multicast RB and/or associated unicast RB. Each UE receiving MBS is also configured with at least one corresponding associated unicast RB for reliability. In one scenario, multicast services are configured with unicast radio bearers. A multicast service-3 is delivered to UE 113 and UE 114 via unicast radio link 131 and 134, respectively. In one embodiment, the MBS delivered through unicast bearer through PTP protocol stack are switched to PTM leg configured for the UE upon detecting predefined events. The gNB, upon detecting one or more triggering event, switches service mode from unicast to multicast using PTM legs.

FIG. 1 further illustrates simplified block diagrams of a base station and a mobile device/UE for multicast transmission. gNB 102 has an antenna 156, which transmits and receives radio signals. An RF transceiver circuit 153, coupled with the antenna, receives RF signals from antenna 156, converts them to baseband signals, and sends them to processor 152. RF transceiver 153 also converts received baseband signals from processor 152, converts them to RF signals, and sends out to antenna 156. Processor 152 processes the received baseband signals and invokes different functional modules to perform features in gNB 102. Memory 151 stores program instructions and data 154 to control the operations of gNB 102. gNB 102 also includes a set of control modules 155 that carry out functional tasks to communicate with mobile stations.

FIG. 1 also includes simplified block diagrams of a UE, such as UE 111. The UE has an antenna 165, which transmits and receives radio signals. An RF transceiver circuit 163, coupled with the antenna, receives RF signals from antenna 165, converts them to baseband signals, and sends them to processor 162. In one embodiment, the RF transceiver may comprise two RF modules (not shown). A first RF module is used for HF transmitting and receiving, and the other RF module is used for different frequency bands transmitting and receiving which is different from the HF transceiver. RF transceiver 163 also converts received baseband signals from processor 162, converts them to RF signals, and sends out to antenna 165. Processor 162 processes the received baseband signals and invokes different functional modules to perform features in UE 111. Memory 161 stores program instructions and data 164 to control the operations of UE 111. Antenna 165 sends uplink transmission and receives downlink transmissions to/from antenna 156 of gNB 102.

The UE also includes a set of control modules that carry out functional tasks. These control modules can be implemented by circuits, software, firmware, or a combination of them. An MBS configuration module 191 configures an MBS with a network entity in the wireless network, wherein the MBS is configured with a point-to-multipoint (PTM) radio bearer (RB) and an associated point-to-point (PTP) RB. A protocol module 192 establishes a compact UE protocol stack for data reception of MBS data packets from both the PTM RB and the PTP RB. A monitor module 193 monitors a PTM logical channel (LCH) for PTM data packets and a PTP LCH for PTP data packets, wherein the PTM LCH and the PTP LCH are independent. An assembling module 194 assembles data packets from the PTM LCH and the PTP LCH at one UE protocol entity of the compact UE protocol stack. A feedback module 195 provides uplink feedback for MBS data reception status through the PTP RB using a cell radio network temporary identifier (C-RNTI).

Figure 2A:
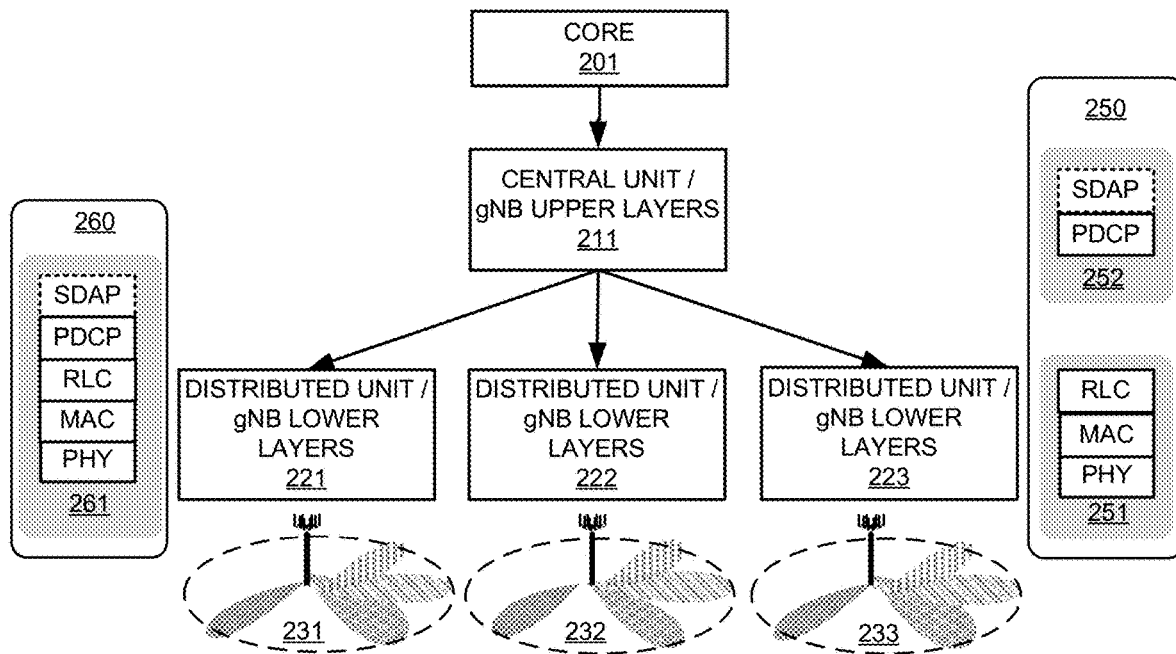
FIG. 2A illustrates an exemplary NR wireless system with centralized upper layers of the NR radio interface stacks and UE stack with multicast protocol and unicast protocol.

FIG. 2A illustrates an exemplary NR wireless system with centralized upper layers of the NR radio interface stacks and UE stack with multicast protocol and unicast protocol. Different protocol split options between central unit (CU) and distributed unit (DU) of gNB nodes may be possible. The functional split between the CU and DU of gNB nodes may depend on the transport layer. Low performance transport between the CU and DU of gNB nodes can enable the higher protocol layers of the NR radio stacks to be supported in the CU, since the higher protocol layers have lower performance requirements on the transport layer in terms of bandwidth, delay, synchronization, and jitter. In one embodiment, SDAP and PDCP layer are located in the CU, while RLC, MAC and PHY layers are located in the DU. A core unit 201 is connected with one central unit 211 with gNB upper layer 252. In one embodiment 250, gNB upper layer 252 includes the PDCP layer and optionally the SDAP layer. Central unit 211 connects with distributed units 221, 222, and 221. Distributed units 221, 222, and 223 each corresponds to a cell 231, 232, and 233, respectively. The DUs, such as 221, 222 and 223 includes gNB lower layers 251. In one embodiment, gNB lower layers 251 include the PHY, MAC and the RLC layers. In another embodiment 260, each gNB has the protocol stacks 261 including SDAP, PDCP, RLC, MAC and PHY layers.

Figure 2B:
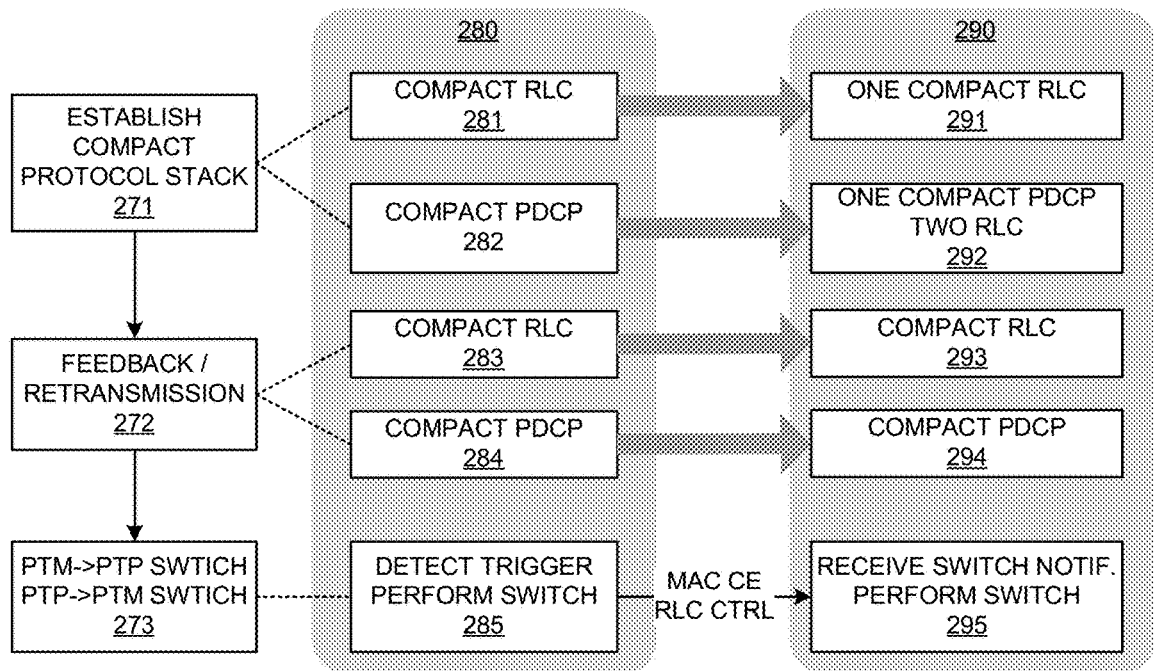
FIG. 2B illustrates exemplary top-level functional diagrams for reliable multicast services with compact protocol stack.

FIG. 2B illustrates exemplary top-level functional diagrams for reliable multicast services with compact protocol stack. A UE 290 is configured with one or more MBS with a network entity 280, such as a gNB. Network entity 280 transmits MBS data packets to one or more UEs. The network needs to establish one or multiple radio bearers (RBs) corresponding to the multicast flows of a particular multicast session in order to support the multicast transmission in the downlink over the air. The multiple RBs can be subject to Point-to-Multiple (PTM) or Point-to-Point (PTP) transmission within a cell. For the PTM transmission, the multicast RB is a PTM RB. For the PTP transmission, the unicast RB is a PTP RB. In one novel aspect, an MBS is configured between the UE and the network entity.

At step 271, the UE and the network entity each establishes a compact protocol stack for MBS data packets from both the PTM RB and the PTP RB. In one embodiment, the compact protocol entity is at the RLC layer. At step 281, the compact network protocol stack at the network entity includes a compact RLC entity that maintains independent retransmission buffers for each corresponding subscriber UEs. Correspondingly, at step 291, the UE compact protocol stack includes one compact radio link control (RLC) entity and one packet data convergence protocol (PDCP) entity, and wherein the compact RLC entity assembles MBS data packets received from the PTM LCH and the PTP LCH. The sequence numbers (SNs) for RLC data packets are aligned between data packets from the PTM LCH and data packets from the PTP LCH. In another embodiment, the compact protocol entity is at the PDCP layer. At step 282, the compact network protocol stack for the network entity includes a compact PDCP entity that maintains independent retransmission buffers for each corresponding subscriber UEs. At step 292, correspondingly, the UE compact protocol stack includes one compact PDCP entity and two RLC entities that one for the PTM data packets and one for the PTP data packets, and wherein the compact PDCP entity assembles MBS data packets received from the PTM LCH and the PTP LCH. The SN for PDCP data packets is aligned between data packets from the PTM LCH and data packets from the PTP LCH.

At step 271, UE 290 provides uplink feedback for MBS data reception status through the PTP RB using a cell radio network temporary identifier (C-RNTI) to the network entity 280. The network entity monitors feedback report from each subscriber UEs through corresponding PTP RB and retransmits MBS data packets to one or more UEs through corresponding PTP RBs based on corresponding feedback reports. In one embodiment, at step 283, the retransmission is handled by the compact RLC entity at the network entity. Correspondingly, at step 293, the uplink feedback is a RLC status report and handled at the UE compact RLC entity. In another embodiment, at step 284, the retransmission is handled by the compact PDCP entity at the network entity. Correspondingly, at step 293, the uplink feedback is a PDCP status report and handled at the UE compact PDCP entity. The PTM-to-PTP mode switch or the PTP-to-PTM mode switch are performed. At step 285, the network entity switches from a PTM mode to a PTP mode upon detecting one or more PTM-to-PTP triggering events, wherein transmission through the PTM RB is disabled in the PTP mode and MBS data packets are transmitted through the one or more PTP RBs; and switches from the PTP mode to the PTM mode upon detecting one or more PTP-to-PTM triggering events. The network entity/the base station indicates a mode switch to the one or more subscriber UEs through a control message selecting from a MAC control element (CE) and a RLC control packet data unit (PDU), and wherein the mode switch comprises a PTM mode to PTP mode switch and a PTP mode to the PTM switch. At step 295, UE 290 receives the mode switch notification and performs the mode switch.

To support the reliable transmission for NR multicast service, a feedback channel in the uplink is needed for each UE receiving the MBS. The receiving UE transmits feedback report about its reception status for MBS to the network. Based on the feedback, the network may perform necessary retransmission to improve the transmission reliability. From uplink feedback perspective, the feedback channel may be used for L2 feedback (e.g., RLC status report and/or PDCP status report). In addition, the feedback channel may be used for HARQ feedback. Furthermore, the feedback should be a bidirectional channel between the UE and the network, with the assumption that the network may take that channel to perform needed packet retransmission. The packet retransmission is L2 retransmission (e.g., RLC retransmission and/or PDCP retransmission). In addition, the feedback channel may be used for HARQ retransmission. The network needs to establish one or multiple multicast Radio Bearers corresponding to the multicast flows of a particular multicast session in order to support the multicast transmission in the downlink over the air. The multicast Radio Bearer (i.e., RB) can be subject to Point-to-Multiple Point (i.e., PTM) or Point-to-Point (i.e., PTP) transmission within a cell. In case of Point-to-Multiple Point transmission, the multicast Radio Bearer is a PTM RB. In case of Point-to-Point transmission, the multicast Radio Bearer is a PTP RB.

Figure 3:
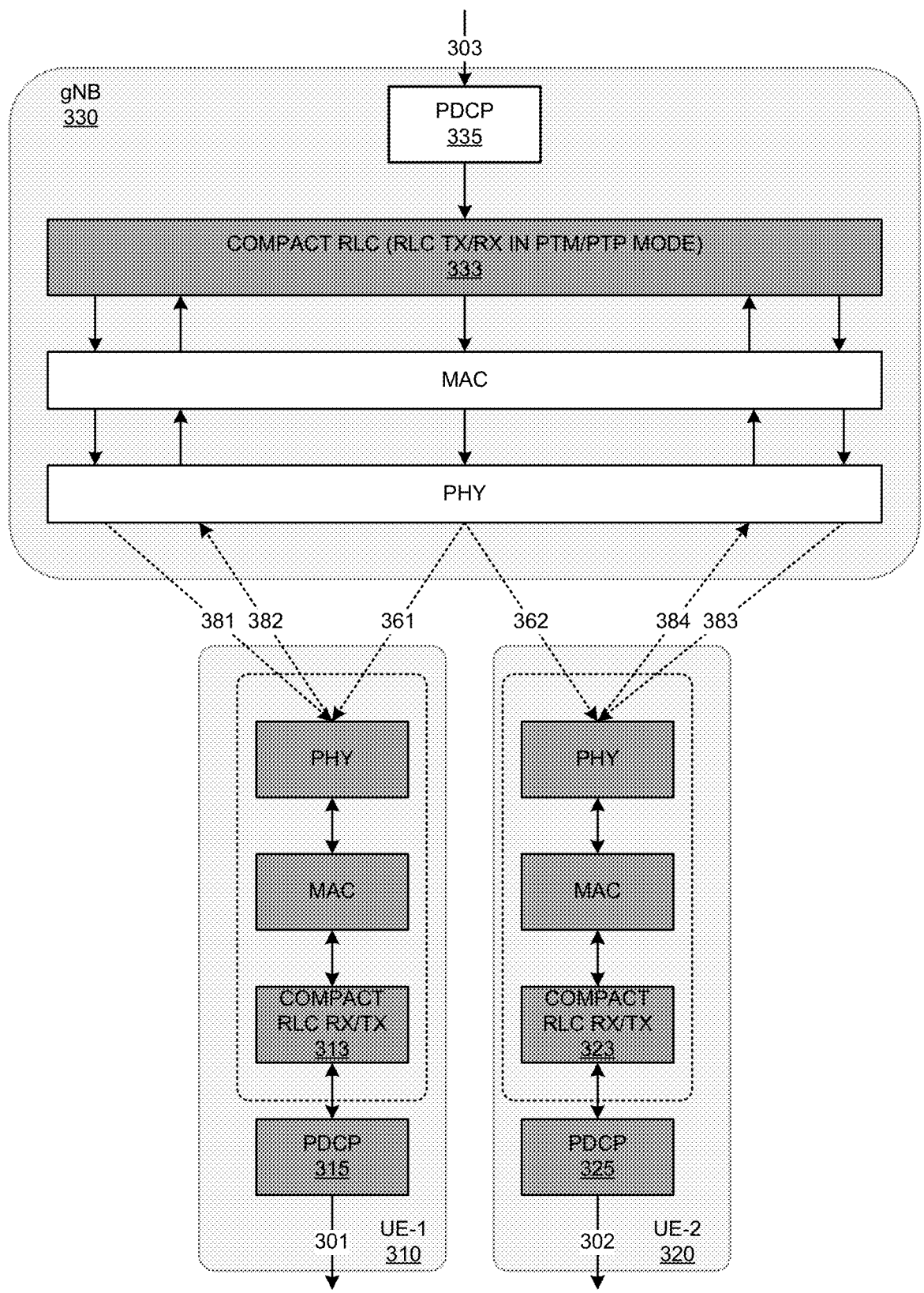
FIG. 3 illustrates exemplary diagrams for RLC-based compact protocol stack supporting reliable multicast services.

FIG. 3 illustrates exemplary diagrams for RLC-based compact protocol stack supporting reliable multicast services. UE-1 310 and UE-2 320 are configured with an MBS. UE-1 310 and UE-2 320 are each configured with a compact protocol stack for MBS data reception and uplink feedback. UE-1 310 compact protocol stack includes a PHY, a MAC, a compact RLC entity 313, and a PDCP entity 315. UE-2 320 compact protocol stack includes a PHY a MAC, a compact RLC entity 323, and a PDCP entity 325. Each corresponding compact protocol stack of UE-1 310 and UE-2 320 processes the received MBS data packets and passes to upper layer as UE reception 301 and 302, respectively. An exemplary network entity, gNB 330, transmits one or more the multicast flows 303 within an MBS to one or more UEs, such as UE-1 310 and UE-2 320. The MBS from gNB 330 is configured with a PTM RB to UE-1 310 and UE-2 320 through 361 and 362, respectively. Associated PTP RB with DL 381 and UL feedback 382 is configured for UE-1 310. Associated PTP RB with DL 383 and UL feedback 384 is configured for UE-2 320.

At network entity, gNB 330, PTM RB is used for downlink (DL) multicast transmission with passed from PDCP entity 335 to compact RLC entity 333. PTM transmission mode is used for downlink (DL) multicast transmission and its RLC transmission mode is in UM mode. In network side, there is only one compact RLC entity 333 established per multicast RB, serving all subscriber UEs for reliable multicast transmission. PDCP entity 335 at network side delivers the PDCP packets to the compact RLC entity. The compact RLC entity 333 maintains an independent retransmission buffer for each UE. The compact RLC entity 333 is tasked to perform both PTM transmission and PTP transmission. A new transmission mode (or cast type) is introduced for compact RLC entity 333. The new transmission mode is the PTM mode and/or PTP mode or multicast type and/or unicast type, in addition to the concept of RLC TM/UM/AM mode. The compact RLC entity 333 runs in PTM mode (or multicast type) for initial PTM transmission and/or PTM Retransmission. Any transmission in PTP mode (or unicast type) is for PTP retransmission. Initial PTM transmission or PTM retransmission of data is multicast to multiple UEs using G-RNTI via a specific logical channel (LCH). The LCH for PTM transmission can be MTCH. PTP retransmissions, if needed, is unicast to the UE using C-RNTI via a unicast LCH (i.e., DTCH). One compact RLC entity 333 corresponds to multiple logical channels.

At UE side, compact protocol stack is established for the reception of both PTM transmission and PTP transmission for a particular multicast RB. The UE establishes a single DRB with a compact RLC entity, in RLC AM mode, and a single PDCP entity for the multicast RB. The UE monitors two independent LCHs (one for PTM data and the other for PTP data) via different RNTIs. UE monitors the PTM LCH based on a group RNTI (G-RNTI) and monitors the PTP LCH based on the C-RNTI. The UE assembles the data packets from two independent LCHs at the compact RLC entity, such as compact RLC entity 313 and 322, assuming the SN is aligned. The SN is allocated by the compact RLC entity with a single SN allocation function block at network side. In uplink, UE provides the uplink feedback (i.e., RLC status report) using C-RNTI to the network. In one embodiment, the feedback report is transmitted to the network when a polling request is received for the multicast transmission.

In one embodiment, a mode switch, including PTM-to-PTP and PTP-to-PTM, is performed upon one or more triggering events is detected. In one embodiment, the network entity detects the triggering events. In one embodiment, the PTM-to-PTP triggering event comprise a number of subscribers for the MBS is lower than a predefined PTM threshold. When too few remaining UEs participate the multicast reception, the PTM transmission should be deactivated. This is the PTM-to-PTP switch, or the multicast-to-unicast switch. In this case, the PTM transmission mode is disabled within the compact RLC entity 333. Only PTP transmission mode is enabled within the compact RLC entity 333. In the after-switch PTP mode, the PTP transmission mode is enabled for initial transmission for the MBS for each UE. In another scenario, the network detects one or more PTP-to-PTM triggering events comprising the number of subscribers for the MBS is higher than a predefined PTP threshold. When the number of the UEs participating in the multicast reception outnumbers a PTP threshold, the PTM transmission should be activated. This is the PTP-to-PTM switch, or the unicast-to-multicast switch. In this case, the PTM transmission mode is enabled within the compact RLC entity 333. The PTP transmission mode is kept within the compact RLC entity 333 for each UE. However, the PTP transmission mode is only enabled for the retransmission for each UE. In one embodiment, the base station indicates a mode switch to the one or more subscriber UEs through a control message selecting from a MAC control element (CE) and a RLC control packet data unit (PDU). The mode switch includes a PTM mode to PTP mode switch and a PTP mode to the PTM switch. The identity of the multicast logical channel is included for the UE to adjust its monitoring behavior. For example, after PTM-to-PTP switch, the UE needs to stop its monitoring on the corresponding PDCCH scrambled by G-RNTI that applies to the PTM transmission. After the PTP-to-PTM switch, the UE needs to start its monitoring on the corresponding PDCCH scrambled by G-RNTI that applies to the PTM transmission.

Figure 4:
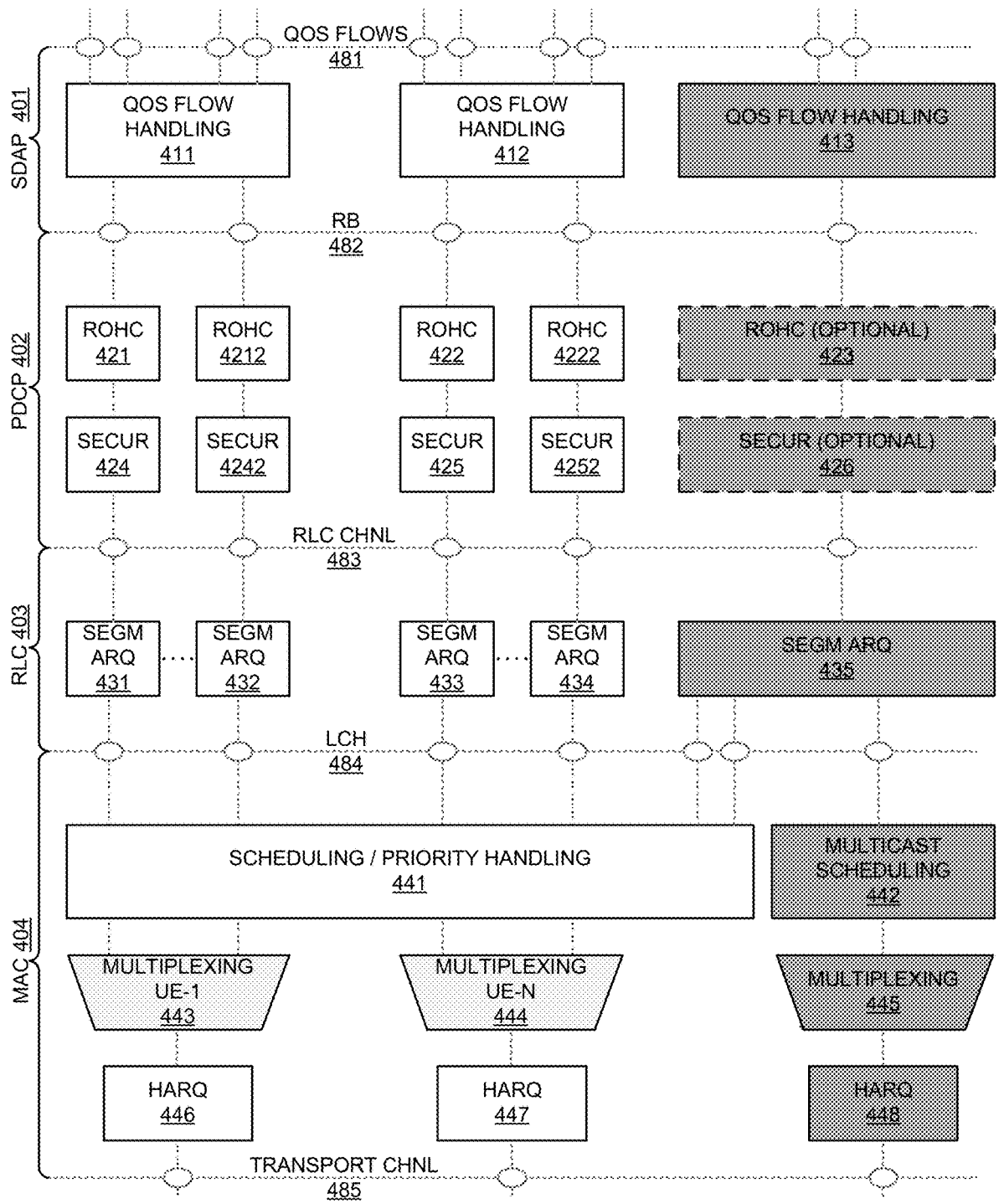
FIG. 4 illustrates an exemplary functional view of downlink RLC-based compact protocol stack for multicast RB transmission.

FIG. 4 illustrates an exemplary functional view of downlink RLC-based compact protocol stack for multicast RB transmission. A network entity, such as a base station/gNB, transmits MBS data packets with PTM RB to a number N of UEs and retransmits MBS data packets based on feedbacks through associated PTP RBs with the RLC-based compact protocol stack. An exemplary UE, correspondingly configured with RLC-based compact protocol stack receives MBS data packets on the PTM RB from the bases station and sends feedback to the base station. The multicast is scheduled independently from PTP transmission. The protocol stack for both the base station and the UE includes SDAP layer 401, PDCP layer 402, RLC layer 403, and MAC layer 404. SDAP layer 401 handles QoS flow, including functions at the base station of QOS flow handling 411 for UE-1 and QoS flow handling 412 for UE-N, and functions at the UE of QoS flow handling 413 for the UE. QOS flow 481 are handled in SDAP layer 401. The PDCP layer 402 includes ROHC functions and security functions. The ROHC function and security function is optional for multicast transmission. PDCP layer 402 includes base station functions of ROHC 421 and security 424 for UE-1 multicast, ROHC 4212 and security 4242 for UE-1 unicast, ROHC 422 and security 425 for UE-N multicast, ROHC 4222 and security 4252 for UE-N unicast, and functions at the UE of ROHC 423 and security 426. RBs 482 are handled in PDCP layer 402. The RLC layer 403 includes both segmentation and ARQ function at base Station of segmentation and ARQ 431 for UE-1 multicast, segmentation and ARQ 432 for UE-1 unicast, segmentation and ARQ 433 for UE-N multicast, segmentation and ARQ 434 for UE-N unicast, as well as UE functions of segmentation and ARQ 435 of the UE. RLC channels 483 are handled in RLC layer 403. MAC layer 404 includes functions of scheduling and priority handling 441 at the base station, multiplexing 443 and HARQ 446 for UE-1 at the base station, multiplexing 444 and HARQ 447 for UE-1 at the base station; and functions for the UE of scheduling and priority handling 442 of the UE, multiplexing 445 of the UE and HARQ 448 of the UE. Transport channel 485 are handled at MAC layer 404.

Figure 5:
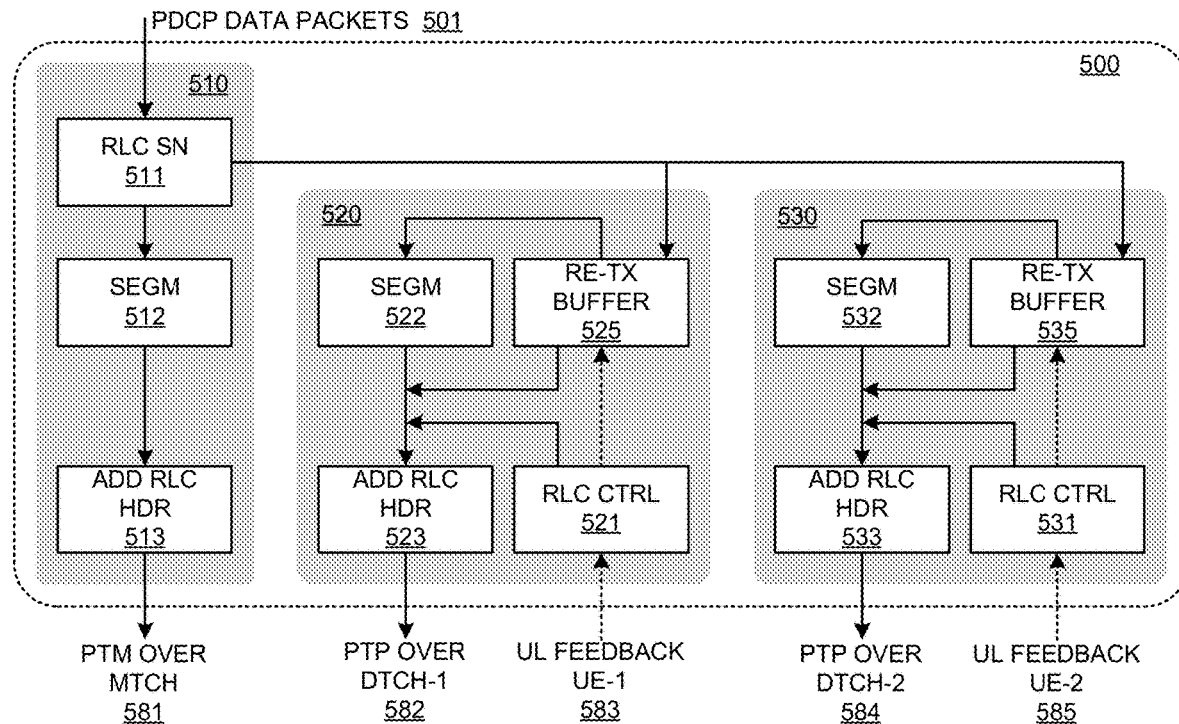
FIG. 5 illustrates an exemplary RLC functional view of RLC-based compact protocol stack at the base station side for multicast RB transmission.

FIG. 5 illustrates an exemplary RLC functional view of RLC-based compact protocol stack at the base station side for multicast RB transmission. The compact RLC entity 500 includes a common PTM functional block 510 shared by all UE, and UE specific PTP functional blocks, such as 520 and 530, per each UE. Compact RLC 500 receives PDCP data packets 501 for MBS. The common PTM functional block 510 works in RLC UM mode. Within the PTM functional block, there are RLC SN allocation 511, segmentation 512 and RLC header-adding functional blocks 513. The RLC SN allocation functional block 511 assigns the RLC SN for RLC packets and delivers the packets to both segmentation function block belonging to the PTM transmission and all UE specific retransmission buffers including 525 and 535. PTM block 510 sends PTM over MTCH 581 to all subscriber UEs.

PTP functional blocks, including exemplary 520 and 530, work in RLC AM mode. The RLC control function blocks, such as RLC control 521 and 531, within each UE PTP functional block receive the control signaling from UE side, such as UL feedback from UE-1 583 for 520 and UL feedback 585 from UE-2 for 530. The RLC control function blocks, such as 521 and 531, within each UE PTP functional blocks, such as 520 and 530, send the RLC status report information to UE specific retransmission buffers, such as 525 and 535, respectively, for data buffer update and Tx window management. In one embodiment, one transmission window is maintained for each UE based on its specific retransmission buffer within the compact RLC entity 500. Each UE specific retransmission buffer within the compact RLC entity 500, such as retransmission buffer 525 for UE-1 and retransmission buffer 535 for UE-2, buffers the RLC packets when they are received from RLC SN allocation function. RLC entity of UE (at UE side) provides RLC status report to network when polling request is received. Each UE specific retransmission buffer within the compact RLC entity 500, such as retransmission buffer 525 for UE-1 and retransmission buffer 535 for UE-2, removes the RLC packets when positive packet status report is received. Each UE specific retransmission buffer within the compact RLC entity 500, such as retransmission buffer 525 for UE-1 and retransmission buffer 535 for UE-2, discards the RLC packets based on a discard timer to avoid too long buffering. Alternatively, a parameter can be configured to limit the number of packets within the buffer. For each PTP leg, such as PTP 520 for UE-1 and PTP 530 for UE-2, a segmentation block, such as segmentation 522 for UE-1 and segmentation 532 for UE-2, performs RLC level segmentation. RLC header is added to the data blocks performed at functional blocks for each PTP leg, such as 523 for UE-1 and 533 for UE-2. Data blocks from each PTP leg, such as 520 for UE-1 and 530 for UE-2, are sent over DTCH for data retransmission to corresponding UEs, such as PTP over DTCH-1 for UE-1 582, and PTP over DTCH-2 for UE-2 584.

Figure 6:
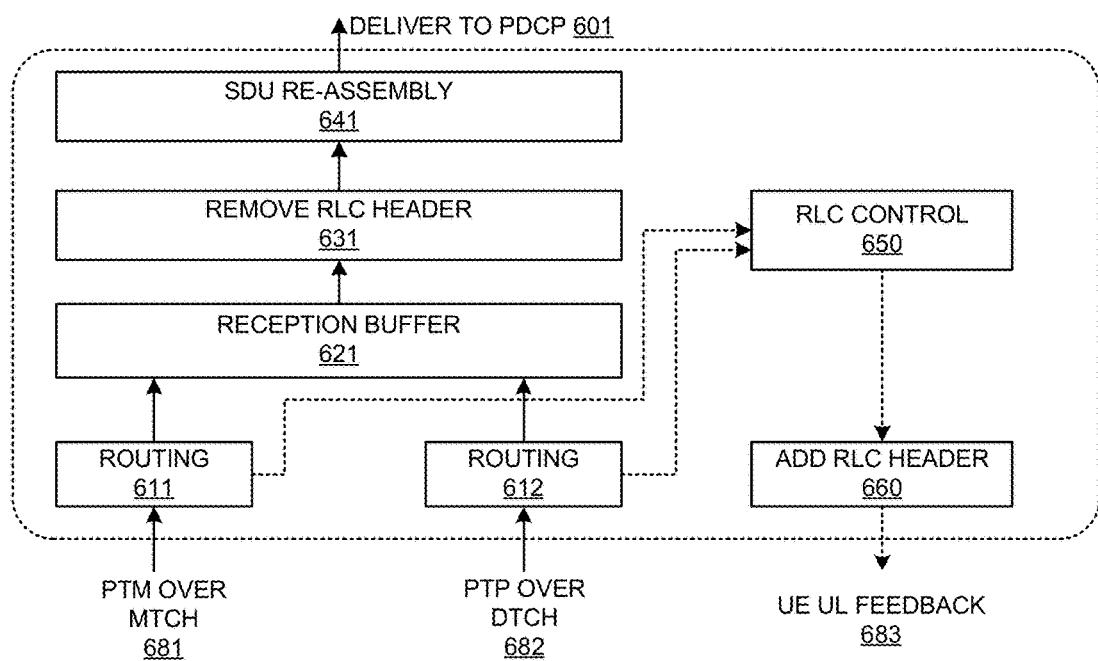
FIG. 6 illustrates an exemplary RLC functional view of RLC-based compact protocol stack at the UE side for multicast RB transmission.

FIG. 6 illustrates an exemplary RLC functional view of RLC-based compact protocol stack at the UE side for multicast RB transmission. UE receives the packets from both PTM logical channel (i.e., MTCH) 681 and PTP logical channel (i.e., DTCH) 682. The routing function blocks 611 for PTM 681, and 612 for PTP 682, classify the data and control signaling. Routing blocks 611 and 612 deliver the data into a common reception buffer 621 and the control signaling to RLC control function block 650. The packets within the reception buffer 621 is subject to RLC header removal 631 before being delivered to SDU assembly function block 641. SDU block 641 re-assemble the data packets and deliver to PDCP at 601. In one embodiment, feedback for the PTM leg reception and/or the PTP leg reception are sent to the network. Routing blocks 611 and 612 communicates with RLC control block 650 with reception status information. RLC control block 650 generates status report and sent the generated UE UL feedback 683 to the network. In one embodiment, UE UL feedback 683 is sent upon a polling request is received.

One exemplary RLC control signaling is the polling request. When the RLC control function block 650 receives the polling request, it generates an RLC status report to the network according to the reception status of the SDU assembly function block 641. The RLC status report indicating the reception status may present both as the RLC SDUs and their segments received from PTM logical channel (i.e., MTCH), as well as the RLC SDUs and their segments received from PTP logical channel (i.e., DTCH). The retransmission over PTP logical channel (i.e., DTCH) is based on RLC SDU, not based on RLC SDU segments. Within the RLC status report, the received RLC SDU and the not-received RLC SDU are indicated only by the SN of RLC SDU. For example, when one of the segments of the RLC SDU packet with SN #1000 is missing at PTM reception, the whole RLC SDU packet with SN #1000 should be retransmitted by PTP logical channel (i.e., DTCH). The RLC SDU packet with SN #1000 may be subjected to different segmentation by PTP transmission over PTP logical channel (i.e., DTCH) from PTM transmission. The UE can either use the segments received from PTM transmission to assemble into a whole RLC SDU or use the segments received from PTP transmission to assemble into a whole RLC SDU. The mix-assembling between PTM segments and PTP segments is not supported for a particular RLC SDU. When the UE only receives a part of the segments of a particular RLC SDU from the PTM transmission, the UE should discard the segments when it feedbacks the corresponding RLC reception status to the network if the corresponding retransmission of that RLC SDU over the PTM leg is not expected. For example, during an inter-cell handover, the target cell with ongoing multicast transmission, establishes a new UE specific function block set within the compact RLC entity for the UE being subject to handover. The source cell forwards the RLC packets, which are not successfully sent to the UE, to the new UE specific function block set within the compact RLC entity at target cell side. There is a retransmission buffer within the new UE specific function block set within the compact RLC entity at the target cell. The retransmission buffer is responsible for delivering the forwarded RLC packets to the UE via PTP transmission mode at dedicated PTP logical channel.

Figure 7:
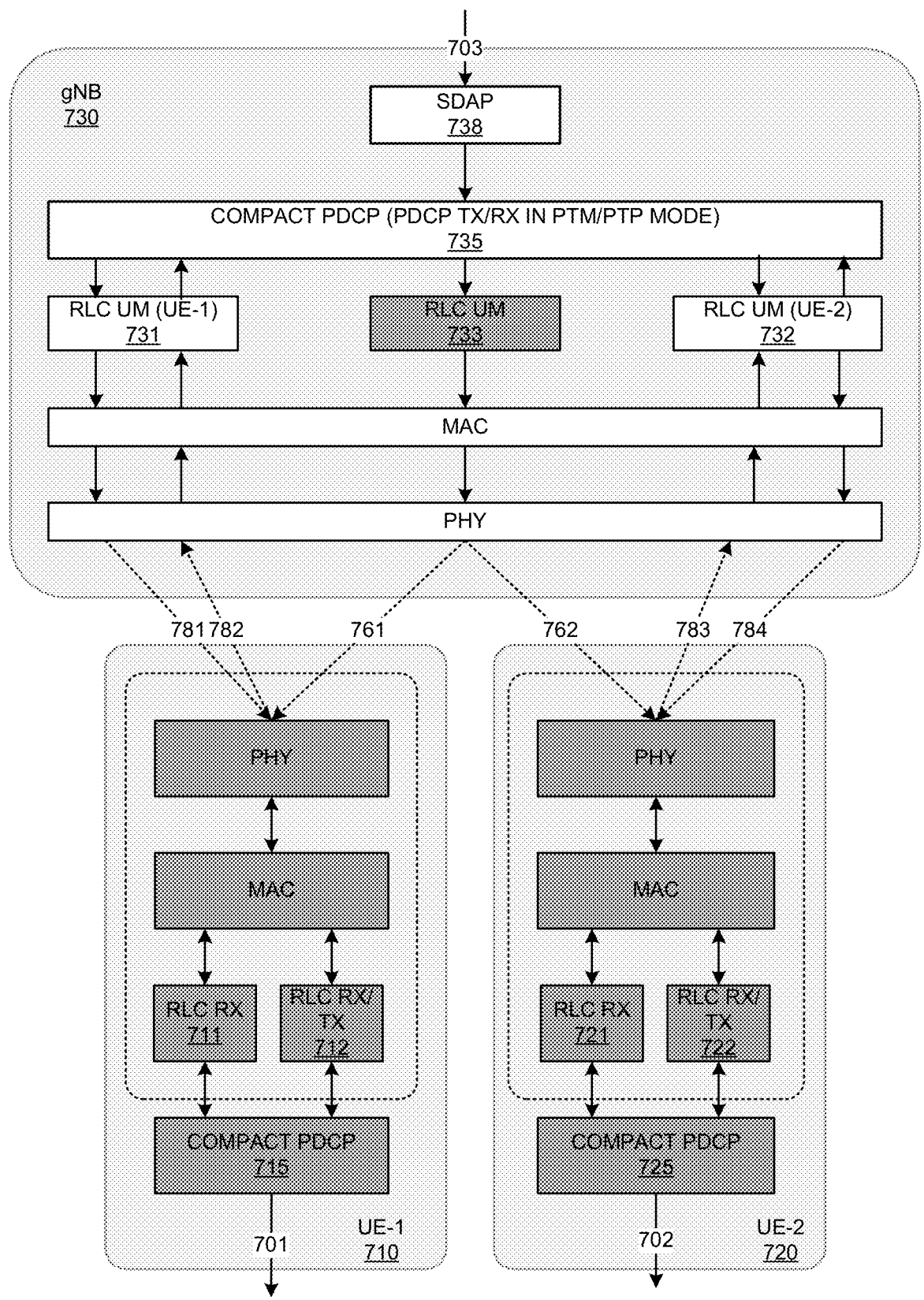
FIG. 7 illustrates exemplary diagrams for PDCP-based compact protocol stack supporting reliable multicast services.

FIG. 7 illustrates exemplary diagrams for PDCP-based compact protocol stack supporting reliable multicast services. UE-1 710 and UE-2 720 are configured with MBS with a gNB 730. In one embodiment, at the base station, the compact network protocol stack includes a compact PDCP entity 735 that maintains independent retransmission buffers for each corresponding subscriber UEs. The compact protocol stack also includes RLC UM for UE-1 731, RLC UM for UE-2 732, and RLC UM for PTM 733. The MBS data packets 703 are sent to the compact PDCP entity 735 from SDAP 738. At the UE side, the compact protocol stack includes one compact PDCP entity, such as 715 of UE-1 710 and 725 of UE-2 720, and two RLC entities that one for the PTM data packets and one for the PTP data packets, and wherein the compact PDCP entity assembles MBS data packets received from the PTM LCH and the PTP LCH. UE compact PDCP entity, such as 715 and 725, assembles and sent the data packets to UE-1 reception 701 and UE-2 reception 702, respectively. UE-1 710 includes RLC RX entity 711 for PTM LCH, and RLC RX/TX entity 712 for the PTP LCH. Similarly, UE-2 720 includes RLC RX entity 721 for PTM LCH, and RLC RX/TX entity 722 for the PTP LCH. gNB 730 transmits PTM 761 and 762 to UE-1 710 and UE-2 720, respectively. PTP UL 782 and DL 781 are PTP data traffic between UE-1 710 and gNB 730. PTP UL 783 and DL 784 are PTP data traffic between UE-2 720 and gNB 730.

The RLC layer runs in UM mode for both PTM transmission and PTP transmission at network side. In network side, there is only a compact PDCP entity 735 per multicast RB, shared by all UEs, for reliable multicast transmission. In network side, there are one multicast RLC entity 733, and one or more UE specific RLC entities, such as RLC 731 and RLC 732, with one UE specific RLC entity per UE. The SDAP entity 738 delivers the packets to the compact PDCP entity 735. The compact PDCP entity 735 maintains independent retransmission buffer for each UE. The compact PDCP entity 735 is tasked for both PTM transmission and PTP transmission. A new transmission mode is introduced for compact PDCP entity 735, namely, the PTM mode and the PTP mode. Compact PDCP entity 735 runs in PTM mode for initial PTM transmission or PTM retransmission. Any transmission in PTP mode is for PTP retransmission. Initial PTM transmission or PTM retransmission of data is multicast to multiple UEs using G-RNTI via specific LCH (i.e., MTCH). PTP retransmissions, if needed, are unicast transmissions to the UE using C-RNTI via a unicast LCH (i.e., DTCH).

At UE side, a compact protocol stack with the compact PDCP entity is configured. The UE monitors two independent LCHs, one for PTM data and the other for PTP data, via different RNTIs. UE establishes one RLC entity for each LCH at RLC layer: one for PTP, such as RLC 712 and RLC 722, and the other for PTM, such as RLC 711 and 721. The RLC entity for PTM reception runs in RLC UM mode. The RLC entity for PTP reception runs in RLC AM mode. The UE assembles the data packets received from two independent RLC entities at PDCP assuming the SN is aligned, as the SN is supposed to be allocated by a single PDCP SN allocation function block at network side. In uplink, UE provides the uplink feedback (i.e., PDCP status report) using C-RNTI.

In one embodiment, at the base station, one transmission window is maintained for each UE via UE specific retransmission buffer within the compact PDCP entity 735. Each UE specific retransmission buffer within compact PDCP entity 735 buffers the PDCP packets when they are received from PDCP SN allocation function block. The PDCP entity of UE, such as PDCP 715 and 725, provides PDCP status report to network. In one embodiment, the PDCP status report is provided when a polling request is received from either PTM transmission leg or PTP transmission leg. Each UE specific retransmission buffer within the compact PDCP entity 735 removes the PDCP packets when positive packet status report is received. Each UE specific retransmission buffer within compact PDCP entity 735 discards the PDCP packets based on a discard timer to avoid too long buffering. Alternatively, a parameter can be configured to limit the number of packets within the buffer.

In another embodiment, the mode switch is performed upon detecting one or more predefined triggering events. When the number of remaining UEs participate the multicast reception is lower than a PTM threshold, the PTM to PTP mode switch is performed. The PTM transmission is deactivated at compact PDCP layer 735. In this case, PTM transmission mode is disabled within the compact PDCP entity 735. Only PTP Transmission mode is enabled within the compact PDCP entity 735. The PTP transmission mode is enabled for initial transmission of the MBS data packets for each UE. In another scenario, when the number of the UEs participating the multicast reception outnumbers a PTP threshold, the PTP mode to PTM mode switch is performed. The PTM transmission is activated at PDCP layer. The PTM transmission mode is enabled within the compact RLC entity 735. The PTP transmission mode is kept within the compact PDCP entity 735 for each UE. However, the PTP transmission mode is only enabled for retransmission for each UE. The aforementioned switches can be ordered by specific signaling e.g., MAC CE or PDCP control PDU from network to the UE. Within the specific signaling, the identity of the multicast logical channel is included for the UE to adjust its monitoring behavior. For example, after PTM-to-PTP switch, the UE needs stop its monitoring on the corresponding PDCCH scrambled by G-RNTI that applies to the PTM transmission. After PTP-to-PTM switch, the UE needs start its monitoring on the corresponding PDCCH scrambled by G-RNTI that applies to the PTM transmission.

Figure 8:
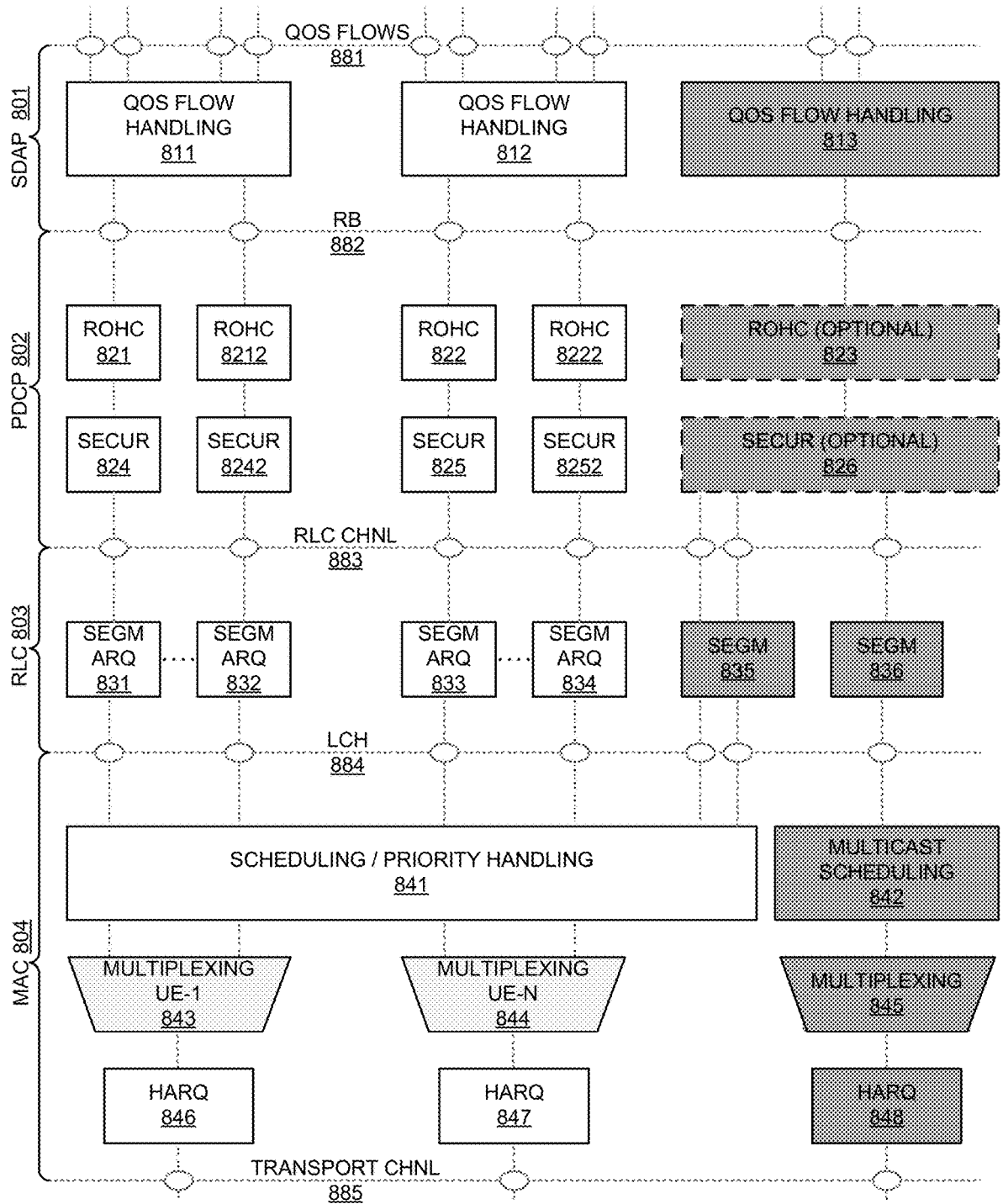
FIG. 8 illustrates an exemplary functional view of downlink PDCP-based compact protocol stack for multicast RB transmission.

FIG. 8 illustrates an exemplary functional view of downlink PDCP-based compact protocol stack for multicast RB transmission. A network entity, such as a base station/gNB, transmits MBS data packets with PTM RB to a number N of UEs and retransmits MBS data packets based on feedbacks through associated PTP RBs with the RLC-based compact protocol stack. An exemplary UE, correspondingly configured with RLC-based compact protocol stack receives MBS data packets on the PTM RB from the bases station and sends feedback to the base station. The multicast is scheduled independently from PTP transmission. The protocol stack for both the base station and the UE includes SDAP layer 801, PDCP layer 802, RLC layer 803, and MAC layer 804. SDAP layer 801 handles QoS flow, including functions at the base station of QoS flow handling 811 for UE-1 and QoS flow handling 812 for UE-N, and functions at the UE of QOS flow handling 813 for the UE. QOS flow 881 are handles in SDAP layer 801. The PDCP layer 802 includes ROHC functions and security functions. The ROHC function and security function is optional for multicast transmission. PDCP layer 802 includes base station functions of ROHC 821 and security 824 for UE-1 multicast, ROHC 8212 and security 8242 for UE-1 unicast, ROHC 822 and security 825 for UE-N multicast, ROHC 8222 and security 8252 for UE-N unicast, and functions at the UE of ROHC 823 and security 826. RBs 882 are handled in PDCP layer 802. The RLC layer 803 includes both segmentation and ARQ function at base Station of segmentation and ARQ 831 for UE-1 multicast, segmentation and ARQ 832 for UE-1 unicast, segmentation and ARQ 833 for UE-N multicast, segmentation and ARQ 834 for UE-N unicast, as well as UE functions of segmentation and ARQ 835 for PTM data and segmentation and ARQ 836 for PTP data of the UE. RLC channels 883 are handled in RLC layer 803. MAC layer 804 includes functions of scheduling and priority handling 841 at the base station, multiplexing 843 and HARQ 846 for UE-1 at the base station, multiplexing 844 and HARQ 847 for UE-N at the base station; and functions for the UE of scheduling and priority handling 842 of the UE, multiplexing 845 of the UE and HARQ 848 of the UE. Transport channel 885 are handled at MAC layer 804.

Figure 9:
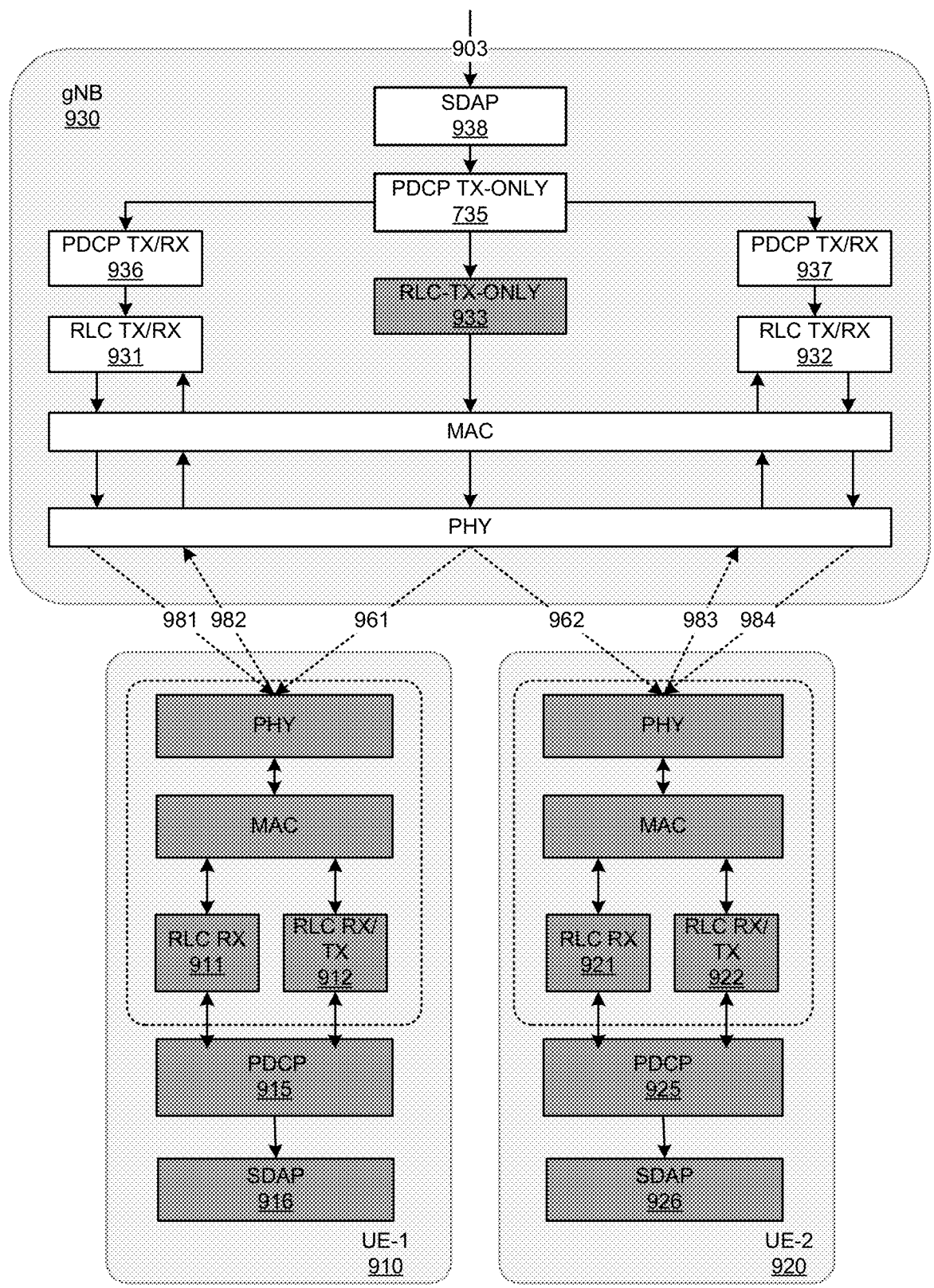
FIG. 9 illustrates an alternative way of reliable multicast transmission with non-compact protocol stack.

FIG. 9 illustrates an alternative way of reliable multicast transmission with non-compact protocol stack. UE-1 910 and UE-2 920 are configured with an MBS. UE-1 910 and UE-2 920 are each configured with a single/combined protocol for MBS data reception and uplink feedback. UE-1 910 single protocol stack includes a PHY, a MAC, an RLC RX entity 911, RLC TX/RX entity 912, a PDCP entity 915, and an SDAP entity 916. UE-2 920 single protocol stack includes a PHY a MAC, an RLC RX entity 921, RLC TX/RX entity 922, a PDCP entity 925, and an SDAP entity 926. Each corresponding single protocol stack of UE-1 910 and UE-2 920 processes the received MBS data packets and passes to upper layer as UE reception 901 and 902, respectively. An exemplary network entity, gNB 930, transmits one or more the multicast flows 903 within an MBS to one or more UEs, such as UE-1 910 and UE-2 920. The MBS from gNB 930 is configured with a PTM RB to UE-1 910 and UE-2 920 through 961 and 962, respectively. Associated PTP RB with DL 981 and UL feedback 982 is configured for UE-1 910. Associated PTP RB with DL 983 and UL feedback 984 is configured for UE-2 920.

In one embodiment, PDCP SN of data packets received from the PTM RB and the PTP RB are both assigned by a PDCP entity at the network entity. Network entity, gNB 930 is configured with a SDAP 938, a PDCP TX-only entity 935, one or more PDCP TX/RX entities, such as PDCP TX/RX entity 936 for UE-1 910 and PDCP TX/RX entity 937 for UE-2 920. The PDCP RLC retransmission functionality is enforced at PDCP layer. The PDCP entity 935 in the network side allocates the SN of PDCP packets and make multicast delivery via PTM RB. The PDCP entity 935 sends the copy of all of the PDCP packets with PDCP SN to the PDCP TX/RX entity 936 of UE-1 and 937 of UE-2. PDCP TX/RX entity 936 of UE-1 and 937 of UE-2 only implement the part of the PDCP functionality (i.e., SN allocation is not needed). PDCP TX/RX entity 936 of UE-1 and 937 of UE-2 buffer the PDCP packets until positive packet status report received for the corresponding PDCP packets. PDCP TX/RX entity 915 of UE-1 and 925 of UE-2 provide PDCP status report to network when polling request is received via the corresponding unicast leg. PDCP TX/RX entity 936 of UE-1 and 937 of UE-2 remove the PDCP packets (PDCP PDU) when positive packet status report received. PDCP TX/RX entity 936 of UE-1 and 937 of UE-2 discard the PDCP packets. The PDCP TX/RX entity of 936 and 937 remove the PDCP packets (PDCP PDU) when positive packet status report received. PDCP TX/RX entity 936 of UE-1 and 937 of UE-2 and 937 discard the PDCP packets based on a discard timer to avoid too long buffering for the packets. The discard timer can be per packet. Alternatively, the discarding of the RLC packets can be performed according to a configured window that defines a number of PDCP packets can be buffered. For example, the new PDCP packets coming may trigger the discarding of the previous PDCP packets, which follows the principle of first-in-first Out (FIFO) if the window reaches the limitation.

Figure 10:
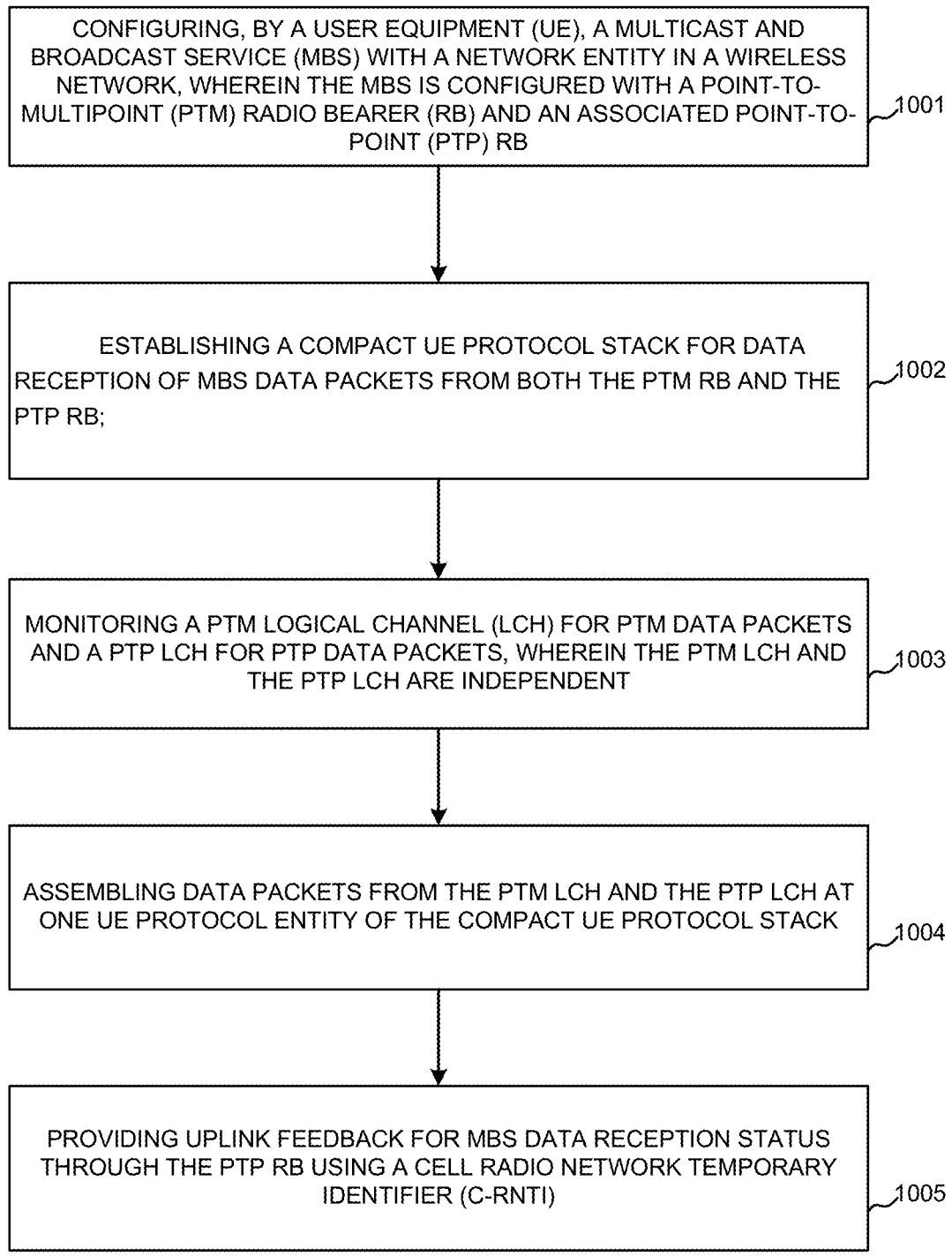
FIG. 10 illustrates an exemplary flow chart for the reliable multicast transmission with compact protocol stack of the UE.

FIG. 10 illustrates an exemplary flow chart for the reliable multicast transmission with compact protocol stack of the UE. At step 1001, the UE configures an MBS with a network entity in a wireless network, wherein the MBS is configured with a point-to-multipoint (PTM) radio bearer (RB) and an associated point-to-point (PTP) RB. At step 1002, the UE establishes a compact UE protocol stack for data reception of MBS data packets from both the PTM RB and the PTP RB. At step 1003, the UE monitors a PTM logical channel (LCH) for PTM data packets and a PTP LCH for PTP data packets, wherein the PTM LCH and the PTP LCH are independent. At step 1004, the UE assembles data packets from the PTM LCH and the PTP LCH at one UE protocol entity of the compact UE protocol stack. At step 1005, the UE provides uplink feedback for MBS data reception status through the PTP RB using a cell radio network temporary identifier (C-RNTI).

Figure 11:
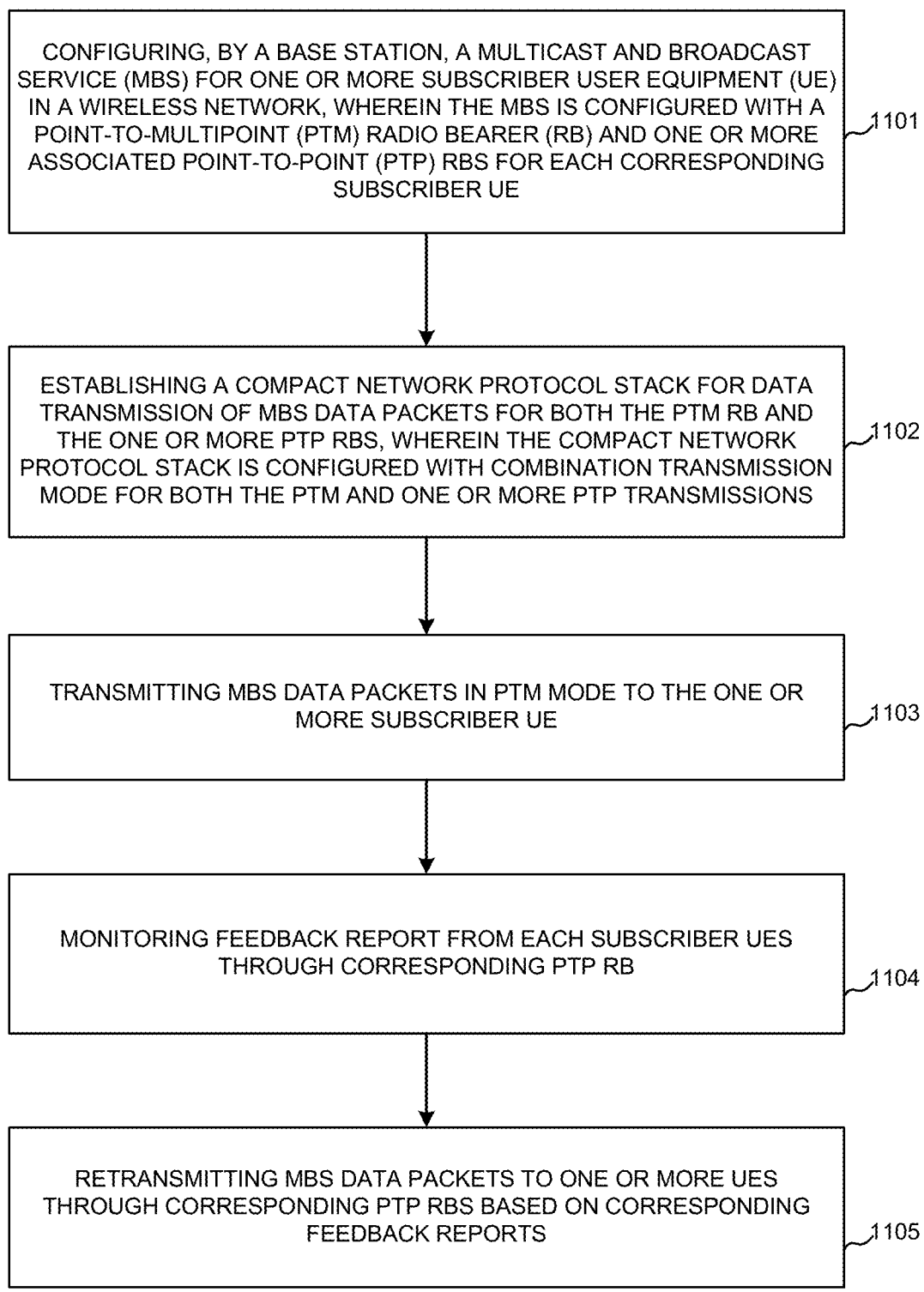
FIG. 11 illustrates an exemplary flow chart for the reliable multicast transmission with compact protocol stack of the base station.

FIG. 11 illustrates an exemplary flow chart for the reliable multicast transmission with compact protocol stack of the base station. At step 1101, the base station configures an MBS for one or more subscriber user equipment (UE) in a wireless network, wherein the MBS is configured with a point-to-multipoint (PTM) radio bearer (RB) and one or more associated point-to-point (PTP) RBs for each corresponding subscriber UE. At step 1102, the base station establishes a compact network protocol stack for data transmission of MBS data packets for both the PTM RB and the one or more PTP RBs, wherein the compact network protocol stack is configured with combination transmission mode for both the PTM and one or more PTP transmissions. At step 1103, the base station transmits MBS data packets in PTM mode to the one or more subscriber UE. At step 1104, the base station monitors feedback report from each subscriber UEs through corresponding PTP RB. At step 1105, the base station retransmits MBS data packets to one or more UEs through corresponding PTP RBs based on corresponding feedback reports.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:
1. A method comprising:
 configuring, by a user equipment (UE), a multicast and broadcast service (MBS) with a network entity in a wireless network, wherein the MBS is configured with a point-to-multipoint (PTM) radio bearer (RB) and an associated point-to-point (PTP) RB;
 establishing a compact UE protocol stack for data reception of MBS data packets from both the PTM RB and the associated PTP RB;

monitoring a PTM logical channel (LCH) for PTM data packets and a PTP LCH for PTP data packets, wherein the PTM LCH and the PTP LCH are independent;

assembling data packets from the PTM LCH and the PTP LCH at one UE protocol entity of the compact UE protocol stack; and providing uplink feedback for MBS data reception status through the associated PTP RB using a cell radio network temporary identifier (C-RNTI).

2. The method of claim 1, wherein the compact UE protocol stack includes one compact radio link control (RLC) entity and one packet data convergence protocol (PDCP) entity, and wherein the compact RLC entity assembles MBS data packets received from the PTM LCH and the PTP LCH.

3. The method of claim 2, wherein sequence numbers (SNs) for RLC data packets are aligned between data packets from the PTM LCH and data packets from the PTP LCH.

4. The method of claim 2, wherein the uplink feedback is an RLC status report.

5. The method of claim 1, wherein the compact UE protocol stack includes one compact PDCP entity and two RLC entities that one for the PTM data packets and one for the PTP data packets, and wherein the compact PDCP entity assembles MBS data packets received from the PTM LCH and the PTP LCH.

6. The method of claim 5, wherein sequence numbers (SNs) for PDCP data packets are aligned between data packets from the PTM LCH and data packets from the PTP LCH.

7. The method of claim 6, wherein the uplink feedback is a PDCP status report.

8. The method of claim 1, wherein the UE monitors the PTM LCH based on a group RNTI (G-RNTI) and monitors the PTP LCH based on the C-RNTI.

9. A method comprising:

configuring, by a base station, a multicast and broadcast service (MBS) for one or more subscriber user equipments (UEs) in a wireless network, wherein the MBS is configured with a point-to-multipoint (PTM) radio bearer (RB) and one or more associated point-to-point (PTP) RBs for each corresponding subscriber UE;

establishing a compact network protocol stack for data transmission of MBS data packets for both the PTM RB and the one or more associated PTP RBs, wherein the compact network protocol stack is configured with combination transmission mode for both the PTM RB and one or more associated PTP RBs;

transmitting MBS data packets in PTM mode to the one or more subscriber UEs;

monitoring feedback report from each subscriber UEs through corresponding associated PTP RB; and retransmitting MBS data packets to one or more UE through corresponding associated PTP RBs based on corresponding feedback reports.

10. The method of claim 9, wherein the compact network protocol stack includes a compact RLC entity that maintains independent retransmission buffers for each corresponding subscriber UEs.

11. The method of claim 9, wherein the compact network protocol stack includes a compact PDCP entity that maintains independent retransmission buffers for each corresponding subscriber UEs.

12. The method of claim 9, further comprising:

switching from a PTM mode to a PTP mode upon detecting one or more PTM-to-PTP triggering events, wherein transmission through the PTM RB is disabled in the PTP mode and MBS data packets are transmitted through the one or more associated PTP RBs; and switching from the PTP mode to the PTM mode upon detecting one or more PTP-to-PTM triggering events.

13. The method of claim 12, wherein the PTM-to-PTP triggering events comprise a number of subscribers for the MBS is lower than a predefined PTM threshold, and wherein the PTP-to-PTM triggering events comprise the number of subscribers for the MBS is higher than a predefined PTP threshold.

14. The method of claim 12, wherein the base station indicates a mode switch to the one or more subscriber UEs through a control message selecting from a MAC control element (CE) and a RLC control packet data unit (PDU), and wherein the mode switch comprises a PTM mode to PTP mode switch and a PTP mode to the PTM switch.

15. A user equipment (UE), comprising:

a transceiver that transmits and receives radio frequency (RF) signal in a wireless network;

a memory; and a processor coupled to the memory, the processor configured to configure a MBS with a network entity in the wireless network, wherein the MBS is configured with a point-to-multipoint (PTM) radio bearer (RB) and an associated point-to-point (PTP) RB;

establish a compact UE protocol stack for data reception of MBS data packets from both the PTM RB and the associated PTP RB;

monitor a PTM logical channel (LCH) for PTM data packets and a PTP LCH for PTP data packets, wherein the PTM LCH and the PTP LCH are independent;

assemble data packets from the PTM LCH and the PTP LCH at one UE protocol entity of the compact UE protocol stack; and provide uplink feedback for MBS data reception status through the associated PTP RB using a cell radio network temporary identifier (C-RNTI).

16. The UE of claim 15, wherein the compact UE protocol stack includes one compact radio link control (RLC) entity and one packet data convergence protocol (PDCP) entity, and wherein the compact RLC entity assembles MBS data packets received from the PTM LCH and the PTP LCH.

17. The UE of claim 16, wherein the uplink feedback is a RLC status report.

18. The UE of claim 15, wherein the compact UE protocol stack includes one compact PDCP entity and two RLC entities that one for the PTM data packets and one for the PTP data packets, and wherein the compact PDCP entity assembles MBS data packets received from the PTM LCH and the PTP LCH.

19. The UE of claim 18, wherein the uplink feedback is a PDCP status report.

20. The UE of claim 15, wherein the UE monitors the PTM LCH based on a group RNTI (G-RNTI) and monitors the PTP LCH based on the C-RNTI.

\* \* \* \* \*